United States Patent [19]

Landers

[11] 3,875,606

[45] Apr. 8, 1975

[54] FOAM FILLED PIPELINE PIG

[75] Inventor: Don B. Landers, Arlington, Tex.

[73] Assignee: Oil States Rubber Company, Arlington, Tex.

[22] Filed: Aug. 15, 1973

[21] Appl. No.: 388,474

[52] U.S. Cl. .................................... 15/104.06 R
[51] Int. Cl. ............................................. B08b 9/04
[58] Field of Search ............ 15/104.06 R, 104.06 A, 15/3.51; 134/8

[56] References Cited
UNITED STATES PATENTS

| | | | |
|---|---|---|---|
| 1,756,378 | 4/1930 | Oberhuber | 15/104.06 R |
| 2,276,109 | 3/1942 | Smith | 15/104.06 R |
| 2,289,109 | 7/1942 | Edwards et al. | 15/104.06 R |
| 2,668,307 | 2/1954 | Preen | 15/104.06 R |
| 3,543,323 | 12/1970 | Girard | 15/104.06 R |
| 3,725,968 | 4/1973 | Knapp et al. | 15/104.06 R |

Primary Examiner—Edward L. Roberts
Attorney, Agent, or Firm—Dowell & Dowell

[57] ABSTRACT

A pig to be propelled by fluid pressure through a pipeline the pig having an outer sleeve member and an inner core member joined to the sleeve member by disc-like members to form a flexible body having one or more elongated torroidal spaces therewithin, and these spaces being filled with a foamed resilient elastomer such as urethane.

8 Claims, 3 Drawing Figures

FOAM FILLED PIPELINE PIG

FIELD OF INVENTION

This invention relates to pigs for swabbing and cleaning pipelines, and more particularly to pigs especially designed and constructed for use in a range of pipelines including those of large diameter where the weight of the pig and the cost of its manufacture tend to be excessive because of the large amount of material used in its construction.

PRIOR ART AND BACKGROUND

The prior art contains numerous foamed material pipeline pigs, for example as shown in U.S. Pat. Nos. 3,659,305; 3,605,159; 3,543,323; 3,602,934; and 3,403,418. Such teachings suffer from various difficulties, however. Where the foamed elastomer directly contacts the pipeline surface the wear rate is too high and the softness of the foamed material provides inadequate wiping action. In some instances, the foamed body is not reinforced by a central core member and therefore the degree of axial foreshortening due to longitudinal compression is not sufficiently controlled. As a result the pig is urged to radially expand too much so that its wear is excessive and it may even tend to bind in the pipeline.

THE INVENTION AND ITS OBJECTS

It is the principal object of this invention to provide a pipeline pig for use in pipes wherein the pig is advantageously made of multiple materials of different densities and characteristics combined to form a structure which is stable so that it holds its general shape but at the same time is flexible and expandable during its passage through a pipeline.

It is another principal object of the invention to provide a pig having particular utility when used in large-diameter pipelines, and in which both weight and cost of materials are conserved while at the same time providing the desired performance characteristics.

Another major object of the invention is to provide a pig capable of expanding during use to improve its wiping action against the pipeline surface as a result of axial compression of the pig and as a result of absorption of pipeline fluids in the foamed material filling the pig.

Yet a further important object of the invention is to provide a pig filled with foamed material which is protected from wear against the pipeline surface by an outer sleeve member made of a different material more resistant to wear.

It is another object of major importance to provide a composite pipeline pig in which most of the volume of the pig comprises foamed elastomeric material, this in combination with an axial core member of harder, more dimensionally stable material which serves to control the degree of axial compression of the pig during use.

Another major object is to provide a pig in which disclike members extend between the inner core member and the inside of the sleeve member to contain the foamed filling and to preserve the spacing between the core member and the sleeve member as well as the general cylindrical shape of the latter. In the latter connection, one or more disc-like members may be advantageously inserted between the core and the sleeve members intermediate their ends to control the bulging of the latter especially where a pig is passing through an enlarged pipeline joint. The breaking up of the foamed filling into separate smaller volumes also tends to increase the stability of the pig. An embodiment of the invention currently being manufactured is four feet in diameter, and the stability of its shape is considerably improved by the use of internal disc-like reinforcements.

Another object is to provide a pig having a central core provided with an axial duct which in the larger diameter pigs can be drilled to produce ducts providing a spraying action against the surface of the pipeline ahead of the pig as it moves therethrough.

Other objects and advantages of the invention will become apparent during the following discussion of the drawings.

BRIEF DESCRIPTION OF THE DRAWING

Referring now to the drawings.

DESCRIPTION OF THE PREFERRED EMBODIMENTS

Figure 1:
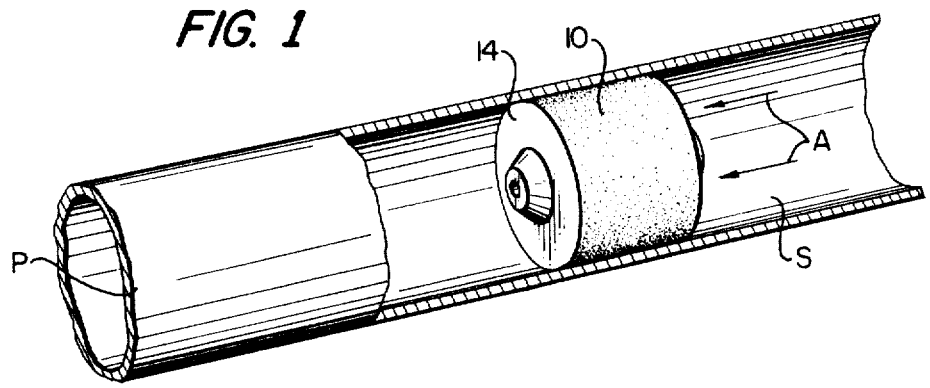
FIG. 1 shows a pipeline P cut away to reveal a pig according to the present invention being propelled in the direction of the arrows A by fluid pressure within the pipeline P, in a manner well known per se in the prior art. Two different forms of the invention are shown in FIGS. 2 and 3 but they are similar to each other in that they both comprise outer sleeve members with core members extending therethrough and joined to the insides of the sleeve members by disc-like members, thereby leaving elongated torroidal spaces enclosed within the above members and filled with a resilient foamed elastomer which is bonded to the members.
Figure 2:
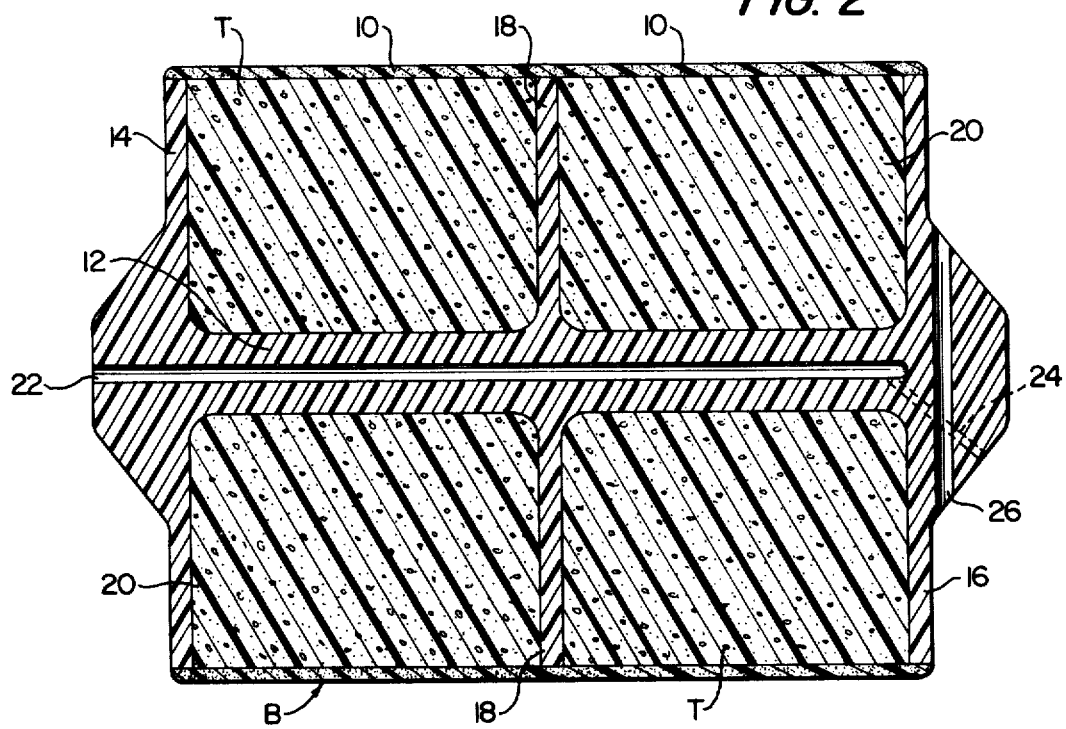

The pipeline pig shown in FIG. 2 comprises an outer sleeve member 10 of diameter to fit snugly within the inside surface S of the pipeline P, the sleeve member 10 surrounding a central core member 12 which extends therethrough. The core member 12 is much smaller in diameter than the inside diameter of the sleeve member 10, preferably less than one-quarter that diameter. There are two disc-like end closure members 14 and 16 which extend from the core 12 and join the inside of the sleeve member 10 so as to enclose elongated torroidal spaces T within the body B comprising the members 10, 12, 14 and 16. These torroidal spaces are filled with foamed resilient elastomeric material 20 such as urethane, which supports the sleeve member 10 and prevents it from slumping inwardly away from the surface S.

The body B is preferably at least half-again longer than its diameter to prevent cocking of the pig within the pipeline P as it travels therethrough. In order to increase the stability as to shape of the pig, it is desirable to add one or more additional disc-like members 18 extending between the core member 12 and the sleeve 10, FIG. 2. The additional disc-like member 18, which divides the filler material 20, gives radial support to the sleeve member 10. Either several abutting sleeve members 10 can be used, or alternatively a single continuous sleeve member can extend the full length of the pig.

In the embodiment shown in FIG. 2, the core member 12, and disc-like members 14, 16 and 18 are preferably made of a flexible material such as castable polyurethane, or some other non-foamed material, and the sleeve members 10 are made of a flexible material which is semi-pervious to liquids and is of greater density than the foamed filler material 20 within the body, i.e., a semi-foamed material. The advantage of a semi-foamed material 10 is that it is dense enough to wipe the surface S with a squeege action but without undue yielding or wearing, but it is also pervious to fluids within the pipeline which can pass through the sleeve material 10 and fill and swell the foamed material 20 which serves to expand the sleeve member 10 into intimate contact with the surface S of the pipeline P. This contact is augmented by the tendency of the body B to be foreshortened by the pressure acting against it in the direction of the arrows A, causing it to swell. The diameter and strength of the core member 12 is selected to control the amount of foreshortening of the body B, although the densities of the foamed materials 10 and 20 also affect the foreshortening.

Figure 3:
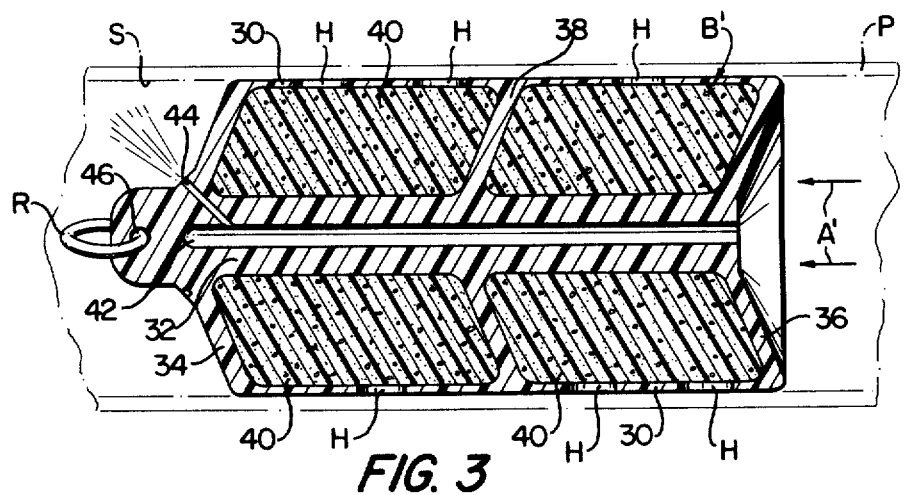

FIG. 3 shows a modified form of the pig which also fits snugly in the pipeline and is propelled by fluid pressure acting in the direction of the arrow A'. Although the embodiment shown in FIG. 2 is bidirectional in the sense that its fluid-pressure propulsion characteristic is about the same in both directions, the modified embodiment shown in FIG. 3 is more unidirectional. It will tend to be expanded more when pushed by fluid pressure in the direction of the arrows A', but it can be made to travel more freely when pressure is applied in the opposite direction. The embodiment of FIG. 3 also includes an outer sleeve member 30, a core member 32, and disc-like members 34, 36 and 38, but these extend from the core member 32 along conical surfaces as shown. In the FIG. 3 modification, the sleeve, core, and disc-like members are integrally formed and preferably are made of castable polyurethane having considerable flexibility. The elongated torroidal spaces within the body B' are filled with foamed elastomer such as urethane.

In the embodiments of FIGS. 2 and 3, the respective sleeve members 10 and 30 can be made either of a semi-foamed and liquid pervious material providing both squeege action and liquid passage into the foamed filler, or else they can be made of an impervious material. In the latter case, they should be provided all over with holes H as shown in FIG. 3 to pass liquids into the foam, the edges of such holes also helping the wiping action of the pig on the pipeline surfaces. The filler foamed material can be allowed to fill the holes H to reduce the liklihood of snagging.

In both embodiments the core members 12 and 32 are provided with central ducts 22 and 42, respectively, which extend less than full-length through the core members, but can be extended by drilling the end disc members at an acute angle to provide outwardly extending bores 24 and 44 to provide a spraying action against the pipeline inner surface S as shown in FIG. 3.

In the two embodiments, the small bores 26 and 46 are included for the optional attachment of a towing ring R, for purposes well known in the prior art.

Working embodiments of these pipeline pigs are made by first casting the foamed fillers, placing them and the sleeves in a mold with urethane spacers to center them, and then pouring the castable polyurethane into the mold in and around these members. The ducts are bores 22, 24, 26, 42, 44 and 46 can either be formed at the same time or drilled later as may be desired.

This invention is not to be limited to the exact forms shown in the drawing, for obviously changes may be made within the scope of the following claims.

I claim:

1. A pig to be propelled by fluid pressure through a pipeline having a known nominal inside diameter for wiping its surface, comprising:
   a. a flexible body having a cylindrical outer sleeve member shaped to substantially fit the pipeline inner surface and forming a tough skin-like wiping surface, the length of the body being greater than its diameter and the body having a central core member of flexible material extending through the sleeve member and radially spaced therefrom, the ends of the core member being joined to the ends of the outer sleeve member by disc-like end closure members and further including at least one disc-like member extending between the inner core and the outer sleeve member intermediate the ends of the body and serving to maintain the flexible sleeve member more nearly cylindrical, thereby enclosing between the core member and the skin-like sleeve member multiple elongated toroidal spaces; and
   b. resilient foamed elastomeric material filling said elongated toroidal space and supporting from inside the body said outer skin-like sleeve member.

2. The pipeline pig as set forth in claim 1, wherein the sleeve member and the core member and the disc-like members are all made of the same flexible material, integrally joined together and bonded to the foamed elastomeric material, and the sleeve member has holes extending through it for communicating pipeline fluid into the foamed elastomeric material.

3. The pipeline pig as set forth in claim 1, wherein the core and the disc-like members are all made of the same flexible material integrally joined together, and the outer sleeve member is made of a semi-foamed elastomeric material bonded to the disc-like members and to the foamed material.

4. The pipeline pig as set forth in claim 3, wherein the outer sleeve member is made of a fluid pervious material, thereby permitting the pipeline fluid to permeate into the foamed material within the sleeve member.

5. The pipeline pig as set forth in claim 1, wherein said disc-like members extend from the core along conical surfaces thereby providing a pig having different propulsion characteristics in the two opposite directions within a pipeline.

6. The pipeline pig as set forth in claim 1, wherein the core has a small diameter duct extending from one end of the body and joining outwardly directed bores near the other end of the body to provide an outward spraying action of fluid directed against said pipeline surface when the pig is being propelled by fluid pressure at said one end of the body.

7. The pipeline pig as set forth in claim 1, wherein the core supports towing ring means at one of its ends.

8. The pipeline pig as set forth in claim 1, wherein the body is at least half-again as long as the diameter of the pig, and the diameter of the core member is no greater than one-fourth the inside diameter of the outer sleeve member.

* * * * *